March 24, 1970   R. S. PLOSS ET AL   3,502,875
ELECTRO-OPTIC IMAGE CONVERTER UTILIZING AN ARRAY
OF POINTS IN A POCKELS EFFECT PLATE TO
ESTABLISH DIFFERENTIAL RETARDATION Filed July 6, 1967                                    2 Sheets-Sheet 1

INVENTORS
Richard S. Ploss +
BY Frank A. Torla

Moose, Altman, + Oates
ATTORNEYS

March 24, 1970 R. S. PLOSS ET AL 3,502,875
ELECTRO-OPTIC IMAGE CONVERTER UTILIZING AN ARRAY
OF POINTS IN A POCKELS EFFECT PLATE TO
ESTABLISH DIFFERENTIAL RETARDATION
Filed July 6, 1967 2 Sheets-Sheet 2

INVENTORS
Richard S. Ploss
BY Frank A. Toole
Morse, Altman + Oates
ATTORNEYS

United States Patent Office 3,502,875
Patented Mar. 24, 1970

3,502,875
ELECTRO-OPTIC IMAGE CONVERTER UTILIZING AN ARRAY OF POINTS IN A POCKELS EFFECT PLATE TO ESTABLISH DIFFERENTIAL RETARDATION
Richard S. Ploss, Danvers, and Frank A. Torla, Methuen, Mass., assignors to Baird-Atomic, Inc., Cambridge, Mass., a corporation of Massachusetts
Filed July 6, 1967, Ser. No. 651,564
Int. Cl. G01t 1/16; H01j 31/26
U.S. Cl. 250—83.3         1 Claim

ABSTRACT OF THE DISCLOSURE

An optical image is presented in terms of visible light directed through a polarizer and an analyzer via a Pockels effect plate, different points of which are subjected to different potentials by a multiplicity of electrodes. The electrodes are energized as desired by an electronic circuit or a photoelectric stratum, containing the image information.

Background and summary of the invention

The present invention relates to electro-optics and, more particularly, to electro-optic techniques for transducing one form of image information, e.g. either corresponding electronic signals or an invisible radiation pattern, into a visual presentation. One form of electro-optic valve is characterized by a Pockels effect plate, which exhibits a particular degree of retardation on polarized light when subjected to an applied potential. Thus polarized light transmitted therethrough is rotated between an orientation by which it is transmitted through an analyzer and an orientation by which it is blocked by the analyzer. The primary object of the present invention is to associate with such a Pockels effect plate a multiplicity of electrodes which are capable of differentially retarding transmitted polarized light at different locations thereof. In consequence, an image is provided by a beam of light transmitted through a polarizer and an analyzer via such a Pockels effect plate. The electrode structure may be energized by signals applied by electronic circuitry, by an electron beam, by a photoelectric stratum, etc.

Other objects of the present invention will in part be obvious and will in part appear hereinafter.

Brief description of the drawings

For a fuller understanding of the nature and objects of the present invention, reference is to be had to the following detailed description, taken together with the accompanying drawings, wherein.

Detailed description

Generally, each of the illustrated embodiments of the present invention comprises a source of illumination, a polarizer for light emitted therefrom, a Pockels effect plate through which polarized light from the polarizer is directed, and electrode structure in the form of at least one array of minute electrodes capable of differentially applying different potentials to different points of the Pockels effect plate to achieve differential retardation, an analyzer for differentially attenuating components of the light so retarded by the Pockels effect plate, and a viewing screen. Generally, the polarizer and the analyzer are composed of any of a variety of materials, for example, dichroic polarizers characterized by two polarized beams one of which is isolated from the other by absorption, birefringent polarizers characterized by two polarized beams one of which is isolated from the other by refraction, and crystal polarizers characterized by two polarized beams one of which is isolated from the other by a "pile of plates" interface. Generally, the Pockels effect plate is an electro-optic medium in the form of a uniaxial crystal such as potassium dihydrogen phosphate and isomorphic deuterated potassium dihydrogen phosphate, trigonal crystals such as lithium niobate and isomeric crystals such as cuprous chloride. Preferably the electro-optic plate ranges in thickness between 0.002 inch and one inch. Certain of these materials, all of which exhibit Pockels effect, are described in U.S. Patent No. 2,463,109, issued Mar. 1, 1949 and U.S. Patent No. 2,616,962, issued Nov. 4, 1952, both in the name of Hans Jaffe.

Figure 1:
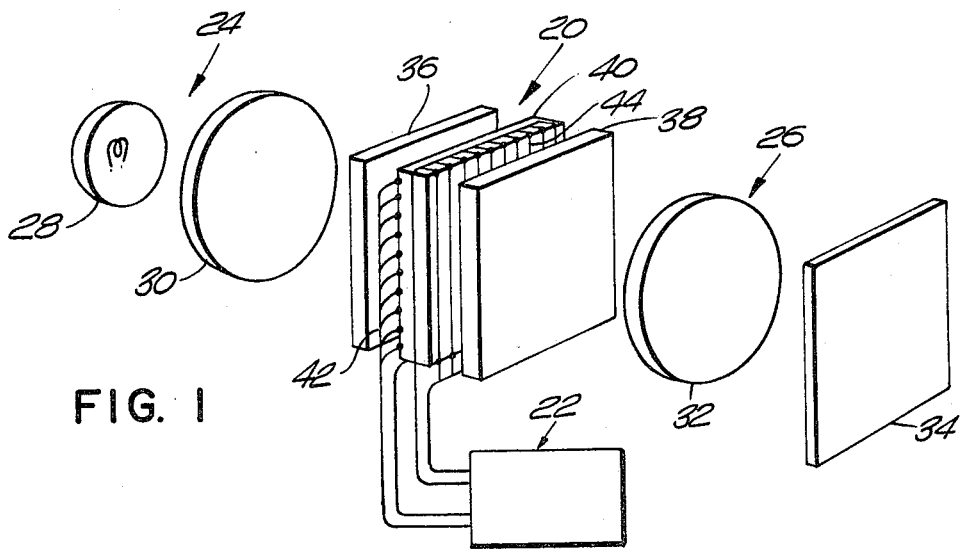
FIG. 1 illustrates a system in accordance with the present invention, having an electrode structure which is composed of crossed grids on opposite sides of the Pockels effect plate.

The embodiment of FIG. 1 comprises an electro-optic assemblage 20 for converting electronic signals from electronic systems 22 into a visible image in terms of light from a source 24, which is directed through assemblage 20 to a projection assemblage 26. In the form shown, source of illumination 24 includes a suitable incandescent lamp 28 and a collimating lens 30. And projection assemblage 26 includes lens 32 and a viewing screen 34.

Electro-optic assemblage 20 includes a polarizing plate 36 and an analyzing plate 38, which are crossed with respect to each other. Between polarizing plate 36 and analyzing plate 38 is a Pockels effect plate 40. At opposite faces of Pockels effect plate 40 are a pair of arrays 42, 44 of electrodes in the form of very fine metallic strips, i.e. silver or aluminum, which are deposited on the opposite faces of the Pockels effect plate by electroplating or vacuum evaporation. As shown, electrodes 42 extend across the face adjacent thereto in parallelism with respect to each other in the horizontal direction. As shown, electrodes 44 extend across the face adjacent thereto in parallelism with respect to each other in the vertical direction. The arrangement is such that at the intersections of the horizontal or X-axis electrodes 42 and of the vertical or Y-axis electrodes 44 are a series of rows and columns of points in the Pockels effect plate, which may be subjected to varying potential. Accordingly, when any particular point of the Pockels effect plate is subjected to a suitable potential, the orientation of light directed through polarizer 36 is rotated to a degree corresponding to the applied potential in such a way as to be transmitted through analyzer 38 to a greater or lesser extent. It will be appreciated that light differentially retarded in the foregoing way at the multiplicity of points defined in the Pockels effect plate serve to establish a visual image.

Figure 2:
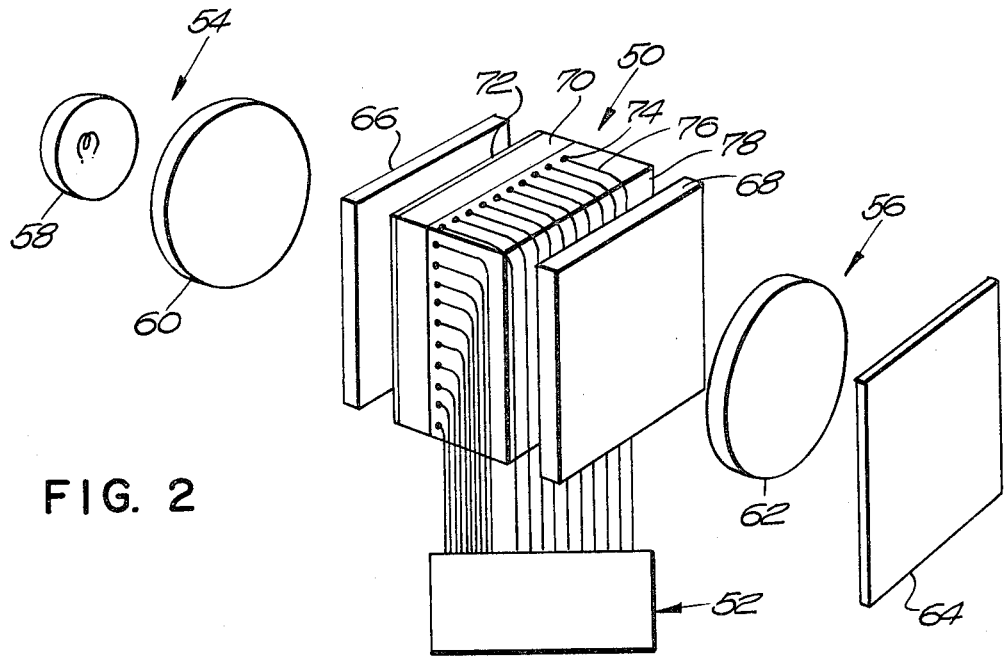
FIG. 2 illustrates an alternative system in which the electrode structure is composed of point electrodes at one face and a conducting stratum on the other face of the Pockels effect plate.

The system of FIG. 2 comprises an electro-optic assemblage 50, which in response to signals applied by an electronic system 52, generates an image in terms of light provided by an illumination source 54 and presented by a projection assemblage 56. Illumination source 54 includes an incandescent lamp 58 and a collimating lens 60. Projection assemblage 56 includes a projection lens 62 and a viewing screen 64.

Electro-optic assemblage 50 includes a polarizing plate 66 and an analyzing plate 68, which are crossed with respect to each other. Between polarizing plate 66 and analyzing plate 68 is a Pockels effect plate 70. At one face of Pockels effect plate 70 is a conducting stratum 72, composed for example of Nesa glass. At the other face of Pockels effect plate 70 is an array of electrodes 74, which are constituted by the extremities of wires 76. Point electrodes 74 are capable of established desired potentials between themselves and conducting plate 72. In one form, for example, wires 76 and point electrodes 74 are provided by plating glass sheets and laminating them together to form a more or less solid glass block 78.

In operation, light from illumination source 54, after being directed through polarizing plate 66 assumes a particular polarization orientation, by which the light normally is blocked by analyzer 68. When, however, a potential is established between one of point 74 and conducting stratum 72, the Pockels effect plate causes rotation of the polarization orientation in its vicinity and consequently increased transmission by analyzer 68.

Figure 3:
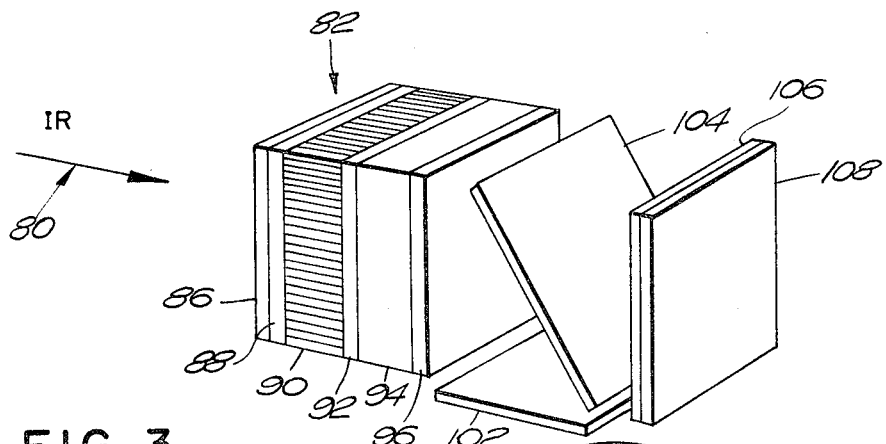
FIG. 3 illustrates an alternative system for use in infrared image conversion.

The system of FIG. 3 is an infrared image converter for receiving an infrared image from a suitable infrared radiation source 80. This system comprises a transducing assemblage 82 and an illuminating and projecting assemblage 84. As shown, transducing assemblage includes in sequence a transparent conducting stratum 86, composed for example of Nesa glass, a photoconducting stratum 88, a multi-electrode array 90, a visible light reflector 92, a Pockels effect plate 94, and a transparent conducting stratum 96, composed for example of Nesa glass. When infrared radiation is directed through conducting stratum 86 to photoconductive stratum 88, photoconductive stratum 88, which is sensitive in the infrared region, produces a differential charge that is applied to the electrodes of array 90. These electrodes are very fine parallel wires extending from the forward to the rearward face of the array in a glass or plastic incapsulation. In consequence, by virtue of the field established between array 90 and conducting stratum 96, a differential retardation pattern is established in Pockels effect plate 94. This differential retardation pattern is converted to a visual image by illumination and projection assemblage 84 in the following manner.

Assemblages 84 comprises an incandescent source 98, a collimating lens 100, a polarizer 102, a beam splitting plate 104, an analyzer 106, and a screen 108. Light from source 98, after being collimated by lens 100, is polarized by plate 102 and reflected by beam splitter 104 through conducting stratum 96 into Pockels effect plate 94. After transmission through Pockels effect plate 94, this light is returned by reflecting stratum 92 back through Pockels effect plate 94 and conducting plate 96, and through beam splitter 104 to analyzer 106, for display on screen 108. It is apparent that Pockels effect plate 94 retards the various components of the beam in such a way that these components are attenuated to a greater or lesser extent by analyzer 106. The result is a visible image on screen 108.

Figure 4:
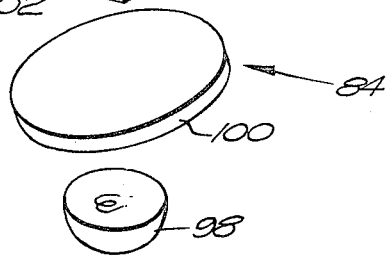
FIG. 4 illustrates an alternative system in which the electrode structure is energized by electron beam scanning.
Figure 4:
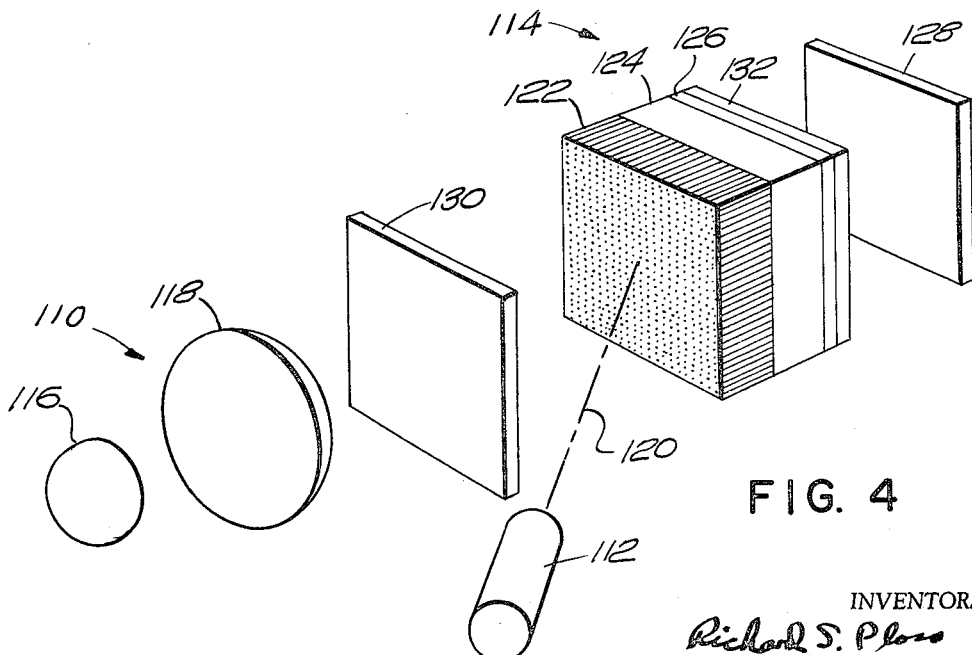

The system of FIG. 4 comprises a device for converting an electronic pattern generated by an electron beam to a visible image in the following way. This system comprises a light source 110, an electron beam scanning assemblage 112 and a transducing assemblage 114. Source 110 includes an incandescent lamp 116 and a collimating lens 118. Electron beam assemblage 112 includes an X-axis, Y-axis for varying the orientation of an electron beam 120 and a Z-axis control for varying the intensity of electron beam 120.

Transducing assemblage 114 includes an array of parallel electrodes 122 which are encapsulated in a plastic block in such a way that opposite extremities of the electrodes are disposed at opposite faces of the block. Electron beam 120 impinges on one face of this block. Array 122, which is in contact with a Pockels effect plate 124, is disposed between electrode array 122 and a conducting plate 126. It is apparent that the charge pattern established in electrodes 122 by electron beam 120 is applied across Pockels effect plate 124 between array 122 and conducting stratum 126. The retardation pattern established in Pockels effect plate 124 as a result is converted into a visible image on a screen 128 by polarizer 130 and analyzer 132, between which the remainder of the transducing assemblage is disposed.

Conclusion

The foregoing disclosure thus provides a variety of electro-optic systems involving Pockels effect plates, by which visible images are produced in response to a nonvisible signal applied by an electronic circuit or a photoconductive stratum. Since certain changes may be made in the foregoing disclosure without departing from the scope of the invention herein, it is intended that all matter contained in the above description or shown in the accompanying drawing be interpreted in an illustrative and not in a limiting sense.

What is claimed is:

1. An image converter for transforming an infrared radiation pattern to a visible light pattern, said image converter comprising a Pockels effect assemblage for converting electrical signals generated by said infrared radiation patern to a retardation pattern, and a visible illumination assemblage for converting said retardation pattern to a visible image, said Pockels effect assemblage including a Pockels effect plate capable of retarding polarized light at various locations thereon to a degree that is functionally related to an applied potential thereacross, and a multiplicity of fine metal electrodes in contiquity with said Pockels effect plate to define therein a multiplicity of points of variable electrical potential, a photoconductive stratum responsive to incident infrared radiation and operatively connected to said electrodes for controlling said electrical potential, said photoconductive stratum and a mirror being positioned at one face of said Pockels effect plate and a polarizer and an analyzer at opposite faces of and communicating with said Pockels effect plate, said visible illumination assemblage including light source means and transmitting-reflecting means for illuminating the other face of said Pockels effect plate and for transferring light returned from said Pockels effect plate by said mirror.

References Cited

UNITED STATES PATENTS

| 3,015,693 | 9/1962 | Volberg et al. |
| 3,182,574 | 5/1965 | Fleisher et al. |
| 3,374,473 | 3/1968 | Cummins _____ 350—150 XR |

FOREIGN PATENTS 454,589　10/1936　Great Britain.

RODNEY D. BENNETT, Jr., Primary Examiner

MALCOLM F. HUBLER, Assistant Examiner

US. Cl. X.R.

250—213; 350—150